United States Patent
Miralles Torla et al.

(10) Patent No.: US 10,052,841 B2
(45) Date of Patent: Aug. 21, 2018

(54) CONSTRUCTION ELEMENT FOR RAISED FLOORS AND THE LIKE AND MANUFACTURING METHOD

(71) Applicant: TORRECID, S.A., Alcora-Castellon (ES)

(72) Inventors: Francisco Javier Miralles Torla, Alcora-Castellon (ES); Carlos Concepción Heydorn, Alcora-Castellon (ES); Francisco Sanmiguel Roche, Alcora-Castellon (ES)

(73) Assignee: TORRECID, S.A., Alcora-Castellon (ES)

( * ) Notice: Subject to any disclaimer, the term of this patent is extended or adjusted under 35 U.S.C. 154(b) by 194 days.

(21) Appl. No.: 14/765,066

(22) PCT Filed: Jan. 23, 2014

(86) PCT No.: PCT/ES2014/070047
§ 371 (c)(1),
(2) Date: Jul. 31, 2015

(87) PCT Pub. No.: WO2014/118410
PCT Pub. Date: Aug. 7, 2014

(65) Prior Publication Data
US 2015/0375473 A1    Dec. 31, 2015

(30) Foreign Application Priority Data
Feb. 1, 2013    (ES) .................................. 201330113

(51) Int. Cl.
*B32B 38/08* (2006.01)
*B32B 5/02* (2006.01)
(Continued)

(52) U.S. Cl.
CPC .............. *B32B 5/028* (2013.01); *B32B 9/045* (2013.01); *B32B 27/12* (2013.01); *B32B 27/283* (2013.01);
(Continued)

(58) Field of Classification Search
CPC ..... B32B 15/14; B32B 21/10; B32B 2250/02; B32B 2255/02; B32B 2255/24;
(Continued)

(56) References Cited

U.S. PATENT DOCUMENTS

| | | | |
|---|---|---|---|
| 2008/0254281 A1* | 10/2008 | Chen | B29C 51/004 428/335 |
| 2011/0027520 A1 | 2/2011 | Lauterbach et al. | |
| 2012/0015176 A1* | 1/2012 | Riebel | B32B 27/06 428/323 |

FOREIGN PATENT DOCUMENTS

| | | |
|---|---|---|
| ES | 2 160 664 T3 | 11/2001 |
| GB | 2 188 657 A | 10/1987 |

OTHER PUBLICATIONS

International Search Report for PCT/ES2014/070047 dated Mar. 26, 2014.

* cited by examiner

*Primary Examiner* — Lawrence Ferguson
(74) *Attorney, Agent, or Firm* — Sughrue Mion, PLLC

(57) ABSTRACT

Construction element for raised floors and the like and manufacturing method thereof, which relates to a construction element for both indoor and outdoor raised floors and the like, characterized in that it is made up of a rigid component reinforced by a polymeric matrix composed of a resin, in a percentage by weight comprised between 80 and 95% of the total weight, combined with a catalyst, the percentage by weight of which being between 5 and 20% of the total weight, which has a filament fiber mesh completely (Continued)

embedded within, the proportion by weight of the embedded mesh being less than 50% relative to the assembly formed by the polymeric matrix plus mesh, and a method for the manufacture thereof. A method for the manufacture of said element is also described.

21 Claims, 2 Drawing Sheets

(51) Int. Cl.
| | |
|---|---|
| *B32B 37/18* | (2006.01) |
| *E04F 15/024* | (2006.01) |
| *E04F 15/08* | (2006.01) |
| *B32B 9/04* | (2006.01) |
| *B32B 27/12* | (2006.01) |
| *B32B 27/28* | (2006.01) |
| *B32B 27/30* | (2006.01) |
| *B32B 27/36* | (2006.01) |
| *B32B 27/38* | (2006.01) |
| *B32B 27/40* | (2006.01) |
| *E04F 15/10* | (2006.01) |
| *B32B 9/00* | (2006.01) |
| *B32B 15/14* | (2006.01) |
| *B32B 21/10* | (2006.01) |
| *B32B 3/02* | (2006.01) |

(52) U.S. Cl.
CPC ............ *B32B 27/308* (2013.01); *B32B 27/36* (2013.01); *B32B 27/38* (2013.01); *B32B 27/40* (2013.01); *B32B 37/18* (2013.01); *B32B 38/08* (2013.01); *E04F 15/02405* (2013.01); *E04F 15/087* (2013.01); *E04F 15/107* (2013.01); *B32B 3/02* (2013.01); *B32B 9/002* (2013.01); *B32B 9/005* (2013.01); *B32B 9/047* (2013.01); *B32B 15/14* (2013.01); *B32B 21/10* (2013.01); *B32B 2250/02* (2013.01); *B32B 2255/02* (2013.01); *B32B 2255/24* (2013.01); *B32B 2255/26* (2013.01); *B32B 2255/28* (2013.01); *B32B 2260/021* (2013.01); *B32B 2260/046* (2013.01); *B32B 2262/02* (2013.01); *B32B 2262/0276* (2013.01); *B32B 2262/101* (2013.01); *B32B 2262/103* (2013.01); *B32B 2262/106* (2013.01); *B32B 2264/067* (2013.01); *B32B 2307/304* (2013.01); *B32B 2307/50* (2013.01); *B32B 2307/546* (2013.01); *B32B 2307/712* (2013.01); *B32B 2307/718* (2013.01); *B32B 2307/732* (2013.01); *B32B 2419/04* (2013.01); *B32B 2471/00* (2013.01)

(58) Field of Classification Search
CPC ............ B32B 2255/26; B32B 2255/28; B32B 2260/021; B32B 2260/046; B32B 2262/02; B32B 2262/0276; B32B 2262/101; B32B 2262/103
See application file for complete search history.

CONSTRUCTION ELEMENT FOR RAISED FLOORS AND THE LIKE AND MANUFACTURING METHOD

CROSS REFERENCE TO RELATED APPLICATIONS

This application is a National Stage of International Application No. PCT/ES2014/070047 filed Jan. 23, 2014, claiming priority based on Spanish Patent Application No. P201330113 filed Feb. 1, 2013, the contents of all of which are incorporated herein by reference in their entirety.

OBJECT OF THE INVENTION

The present invention relates to a construction element especially designed for reinforcing rigid parts, such as ceramic, stone materials, glass, metal, wood, etc., especially ceramic and glass, and more particularly ceramic, for the subsequent use thereof in both indoor and outdoor raised access floors, and the like, which consists of the adhesion of an assembly formed by a polymer matrix based on hardened resins, in which a mesh of cut threads is embedded that, being arranged on one of the sides of the rigid material, enhances the mechanical properties of the rigid material, making it possible to use it in raised access floors or the like. As a function of the end use of the product, an insulating layer that protects the element against fire may be added, which at the same time provides the product with thermal and acoustic properties.

Furthermore, the invention relates to a manufacturing method for said element.

This invention falls within the field of application comprised in the industrial sector devoted to the manufacture of construction parts and components in general.

This invention improves the properties that the rigid parts of equal thickness would have, thus making it possible to use it in applications where the demands in terms of mechanical performance are very high, such as raised access floors and the like, for example, ventilated facades of buildings, in which the demands in terms of mechanical performance are likewise very high, both due to environmental factors (weather, aggressive environments, etc.) and to social factors (property, use, representation, etc.) and, in general, those applications in which the rigid parts have to be placed on pins, pedestals, crossbars or the like, at a certain height from the support layer.

BACKGROUND OF THE INVENTION

The plates made of ceramic, glass, stone, marble, granite, etc., have been used for some time now, for their placement on raised access floors, i.e. flooring supported on pins, pedestals, crossbars or the like, at a certain height from the concrete layer (natural floor), which enables the passage of mechanical and electrical services through the gap created between both floorings.

The problem with all these materials is that, when they are used in raised access floors, since they rest on pins at several support points, the remaining areas are suspended into the air, and the thickness thereof has to be considerably increased, so as to avoid breakages when these parts have to support loads or the traffic of persons or materials, as well as the deflection caused by the weight load.

This thickness increase entails, firstly, a significant weight increase, since in most cases the plates have to at least double their weight.

Moreover, the weight increase makes them very difficult to place, as a much greater effort is required to handle the materials and it further increases transport costs, since the volume they occupy is much larger than that of the parts having a normal thickness.

All this entails, in addition, an excessive consumption of raw materials.

Likewise, this thickness increase in many cases does not solve the breakage problem, particularly with regard to the impact strength and bending strength thereof.

To solve these problems, there are known solutions, which offer an alternative to the thickness increase, such as for example, the adhesion of calcium sulphate, chipboard panels, gypsum and cellulose fibers, among others, which adhered with a resin onto the back of the part, provide enough strength for the use thereof in raised floors.

Thus, for example, patent EP 2148023 A1 covers the possibility of reinforcing, by means of wood, cement or calcium sulphate or similar, supports such as ceramic, porcelain, stone or the like, for the use thereof in raised floors.

Furthermore, patent EP 1304425 A1 discloses the possibility of reinforcing stone materials with cores made of gypsum and cellulose fibers, indicating, as optimum thickness of the material-reinforcement assembly, 30.3 mm, of which 13.3 mm correspond to the reinforcement thickness.

Moreover, the Spanish patent ES 2258912 also covers the possibility of reinforcing stone materials by adhering one or more ceramic parts to the back of the stone using adhesives and resins.

Solutions such as sticking another similar part or of a different nature as a sandwich are also used, such that an indivisible assembly that improves the strength of the rigid material is obtained.

Accordingly, the invention patent ES 2154562 covers the possibility of adhering a ceramic part, the dimensions of which match the size of the stone material being thereby reinforced.

However, as in the case described at the beginning, these reinforcement materials significantly increase the weight of the material they reinforce. In the case of the materials most typically used, calcium sulphate, the weight is tripled relative to the weight of the rigid plate to be reinforced, or, in the case of the chipboard panel, the weight is doubled relative to the rigid material without that reinforcement. In the case of a part reinforced with another similar part adhered to the back thereof, the weight of the same also doubles.

The reinforcements used are, in addition, very thick. The reason for this thickness is to prevent, aside from the risk of breakage, the deflection problem when a static load is applied on the part being reinforced. According to standard UNE EN 12825, relative to Raised Access Floors, there are static loading requirements established that the parts have to meet for the use thereof in raised flooring. Under section "4.2.2.: Static loading requirements", in table 2, the deflection limits are provided in mm, which, by no means, can be exceeded when applying loads onto the same.

There are other reinforcements for rigid parts, which thickness is very low, however in spite of providing high mechanical strength values, they cannot be used in raised floors. As matter of fact, these reinforcements are focused in reinforcing parts for floors or walls, which are intended for uses different to raised floors.

Specifically, as shown in patent ES 2160664, a reinforcement having a minimum thickness is achieved on a stone material, but has the disadvantage that it cannot be used in raised floors, since as indicated on page 4, lines 50 to 55, with a weight of 600 kg, the deflection of the reinforced part is 7 mm, which is outside the maximum limits allowed for this type of floors, which is 4 mm (such as prescribed by the Standard UNE EN 12825).

In addition, in document ES2160664, mat or mesh percentages above 50% are used, which has the disadvantage of, as it is necessary to use meshes that are very thick to achieve suitable mechanical properties, preventing the mesh from being embedded in the resin with just one application.

Therefore, a second resin application over the mesh would be necessary for the latter to be completely impregnated with the resin, which entails a greater investment, higher costs, a worse aesthetic aspect, etc. without thereby improving the mechanical properties of the material.

Another option in order to have a mesh percent above 50% completely embedded using one single application step, would be to use meshes that are less thick, but then there would be the drawback of not achieving the required mechanical properties.

Furthermore, patent PT 105013 A mentions a 2 mm thick cork reinforcement, for placing floors and walls and; in patent WO 2010/072704 A1, ceramic parts are reinforced with sheets of galvanized steel having a thickness between 0.1 and 1 mm, preferably between 0.3 and 0.5 mm; in both cases the breakage problem is not solved, particularly with regard to the impact strength and bending strength thereof.

DESCRIPTION OF THE INVENTION

A construction element for raised floors and the like characterized in that it is made up of a rigid part reinforced by means of a polymer matrix that has an embedded mesh inside, the weight of which being less than 50% of the weight of the assembly formed by the polymer matrix plus the mesh.

The construction element proposed by the invention, solves the technical problems posed in the aforementioned cases for using thereof in raised access floors, as it allows obtaining a finished product that in addition to having a much lower thickness than the aforementioned elements, it greatly reduces the total weight of the finished product assembly.

This implies a very significant reduction in the manufacturing and transport costs, in addition to facilitating greatly the handling of the parts during the mounting process. A further advantage of the present invention is that the consumption of raw materials is reduced.

The construction element consists of a rigid part, which may be ceramic, glass, metal, natural or artificial stone materials, or wood, preferably ceramic or glass, with a thickness comprised between 6 and 18 mm, with at least one substantially flat surface.

This surface may vary according to the format of the part.

On the substantially flat surface of the part a polymer matrix is placed, the matrix is made up of a resin combined in a well-defined proportion with a catalyst, which upon reacting with a resin produces the hardening of the polymer matrix. By way of catalyst organic acids, anhydrides, amines, thiols with reactive hydrogens, such as dicarboxylic acid anhydride, urea and thiourea derivatives and/or polyamides, can be used, but compounds derived from the family of the amines, such as ethanol amines, alkyl amines, polyamines, aromatic polyamines, cycloaliphatic amines, polyamides, urea and thiourea derivatives or mixtures thereof, are preferably used. The percentage by weight of resin in the polymer matrix is between 80-95% of the total weight, whereas that of the catalyst is between 5-20% of the total weight.

The resins employed may be, among others, epoxy, polyurethane, silicones, elastomers, acrylics, polyester, or a mixture of the above, although preferably they will be epoxy with an average molecular weight less than 700 Umas.

The resin and the catalyst mixture is applied by means of any known method (spray gun, knife, curtain, etc.) on the substantially flat side of the rigid part with a grammage comprised between 0.1 and 5 mm, preferably between 0.3 and 2.5 mm. The viscosity of the mixture, comprised between 2,000 and 14,000 centipoises, preferably between 3,000 and 12,000 centipoises, enables the product to self-level, such that 100% of the coated surface is completely covered, before hardening.

After this has been made, the part passes through a mesher, which delivers a sheet or mesh made up of glass filament fibers, organic polymers and a binder mixture. This fiber could also be made of other materials such as polyester, carbon fiber, plastic-based or metal, although preferably they will be made of glass. The grammage of this mesh may range between 150 and 1.000 gr/m2, preferably between 200 and 800 gr/m2. This sheet is above the mixture indicated the previous paragraph, mixture which is still in a liquid state and with a viscosity low enough, between 2,000 and 14,000 centipoises so the mesh penetrates in the layer of the resin-catalyst mixture, such that when said mixture hardens thereby forming the polymer matrix, the mesh is completely embedded therein, at least 0.2 mm apart from the surface or outer layer of the polymer matrix. The weight of the embedded mesh is less than 50% of the weight of the assembly formed by the polymer matrix plus the mesh.

The hardening or curing of the polymer matrix with the embedded mesh inside it may be carried out at room temperature (unforced drying) or the process may be accelerated carrying out a continuous forced drying (in a tunnel, vertical tray drier, etc.), in batches (furnace or bell), unit by unit ((individual pieces of equipment for applying heat) or a mixture of the above.

With all of the above, finally a single body is obtained formed by the rigid part and the polymer matrix with the mesh embedded therein.

The reinforced rigid part may be realized with the end use dimensions or with larger dimensions, in order to obtain, after a cutting process, parts with the desired dimensions.

Depending on the intended end use of the finished product, a mixture of cork with resins may be applied on the polymer matrix using any known method, being an essential requirement that the resins and the polymer matrix are compatible, to avoid laminating problems, mechanical properties loss, stresses, etc. A particular cork application case is as follows: after applying the polymer matrix and before entering the curing area, i.e. with the resins freshly applied, optionally, it is possible, to apply cork grain on the polymer matrix using a grinder and immediately after spraying or nebulizing a resin in liquid state, compatible with the polymer matrix, over the cork so it adheres to the part when the resin cures. This application is especially useful in cases in which the finished part needs to be fire resistant, because of the use it is intended for or needs to have specific acoustic or thermal properties.

Furthermore, and given that in the intended uses for the material object of the invention require very narrow tolerances relative to the format, the end assembly is ground, such that, upon carrying out this process, the sides that might have fiber or adhesive fragments left are smoothed, while the parts are conveniently sized to the desired dimensions.

Optionally, it is possible to place a PVC edging on the contour of the parts, depending on the end use for which the material is intended.

The construction element formed by a reinforced rigid part according to the invention, is characterized in that the thickness of this assembly, formed by the polymer matrix plus a mesh, is comprised between 0.5 and 5.5 mm. preferably between 1 and 3 mm.

It is also characterized in that the weight of the polymer matrix with the embedded mesh is comprised between 0.75 and 4 kg/m2.

It is further characterized in that the construction element object of the invention has a static load resistance higher than 9 KN.

In addition, it is also characterized in that it complies with the hard body impact test, according to the standard UNE EN 12825:2001 (Spanish standard on Raised Access Floors).

It is further characterized in that the weight of the polymer matrix with the embedded mesh is at least 6 times lighter than the rigid material that is being reinforced.

It is also characterized in that the end thickness of the assembly formed by the rigid part plus the reinforcement for its use in raised access floors is less than 23.5 mm.

The features of the reinforced rigid parts, object of the present invention, enable using them both indoors and outdoors.

DESCRIPTION OF THE FIGURES

In order to complement the description being made below and with the aim of facilitating a perfect understanding of the present invention, a set of drawings is attached as an integral part of said description, in which by way of non-limiting examples the following has been represented.

DESCRIPTION OF A PREFERRED EMBODIMENT

By way of non-limiting exemplary embodiment, below there is a description of the construction element for both indoor and outdoor raised floors and the like, represented in FIG. 4.

Figure 1:
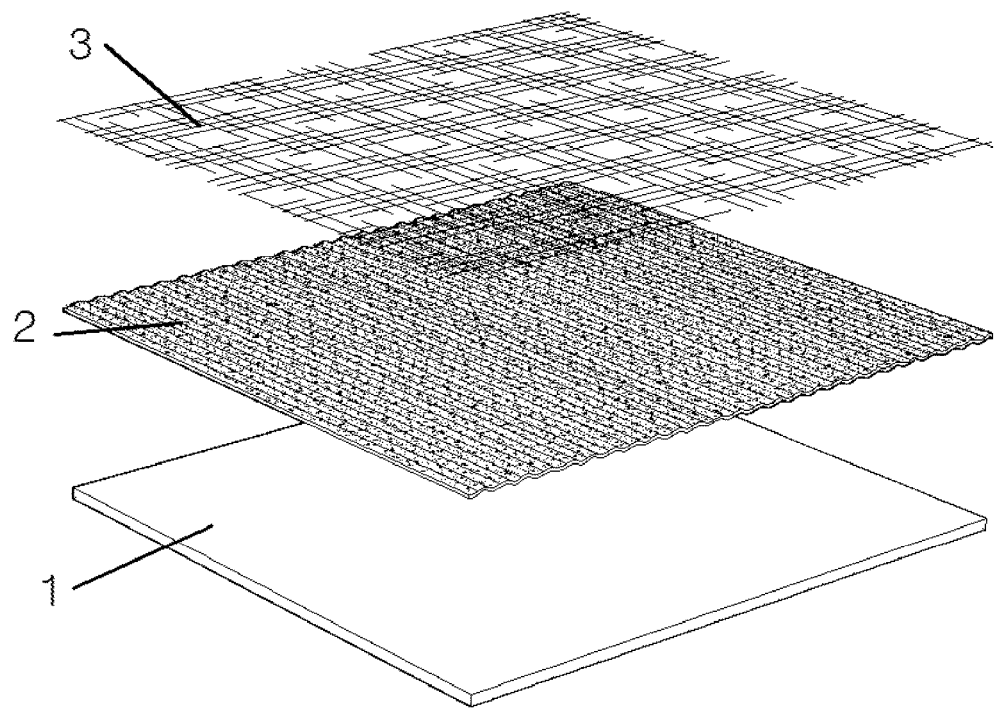
FIG. 1: Shows an exploded perspective view of the composition of the different elements that make up the finished assembly of one part obtained using the method of the present invention.

Regarding FIG. 1, and as it can be observed, on the substantially flat face of a ceramic part of 12 mm, and with a weight of 15 kg/m2 (1), a polymer matrix (2) is applied by means of a spray gun made up of a mixture made up of 85% by weight of epoxy resin with an average molecular weight less than 700 Umas and 15% by weight of a catalyst formed with ethanol amines. The resin and catalyst mixture is applied with a grammage of 1.1 mm and has a viscosity of 6,000 centipoises.

The thickness of the assembly formed by the polymer matrix (2) plus mesh (3), in this exemplary embodiment is 1.5 mm and its weight is 2 kg/m2.

When said polymer matrix (2) is self-leveled, such that 100% of the coated surface is completely covered, and before hardening, i.e. while is still in a liquid state, a mesher, delivers a sheet or mesh (3) made up of glass filament fibers with a grammage of 500 gr/m2.

Figure 2:
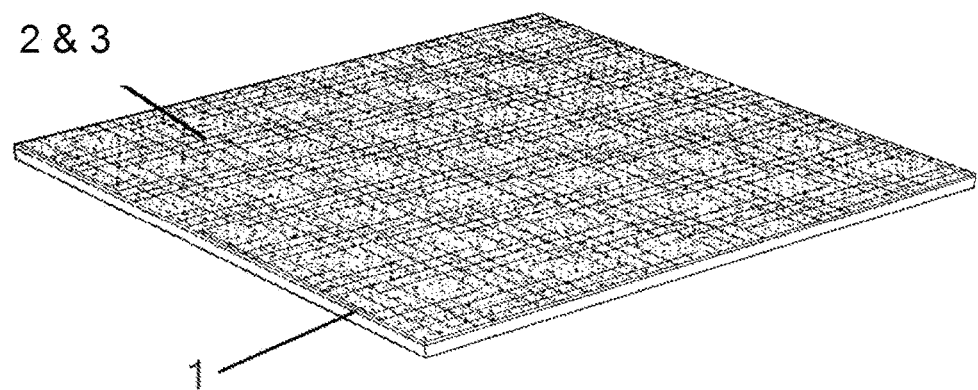
FIG. 2: Shows, also from a perspective view, the part of the previous figure completely finished.
Figure 3:
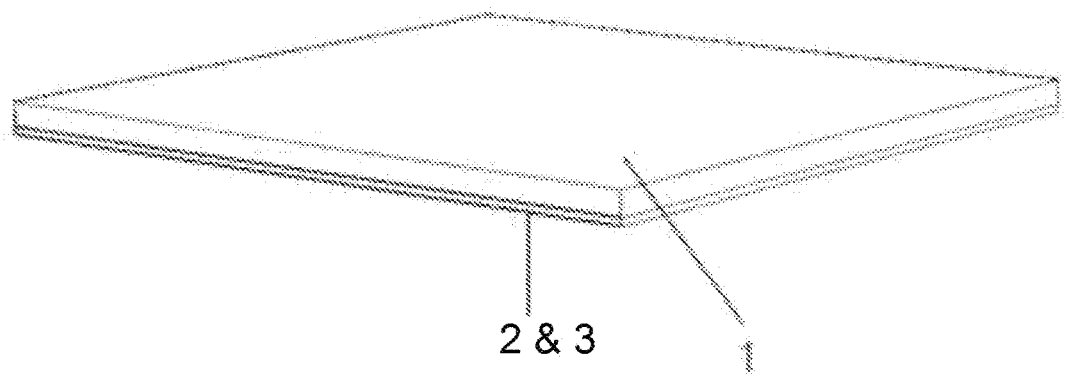
FIG. 3: Shows the same finished part seen from the upper portion thereof, such that it is therefore verified that the upper portion of the part is not affected.
Figure 4:
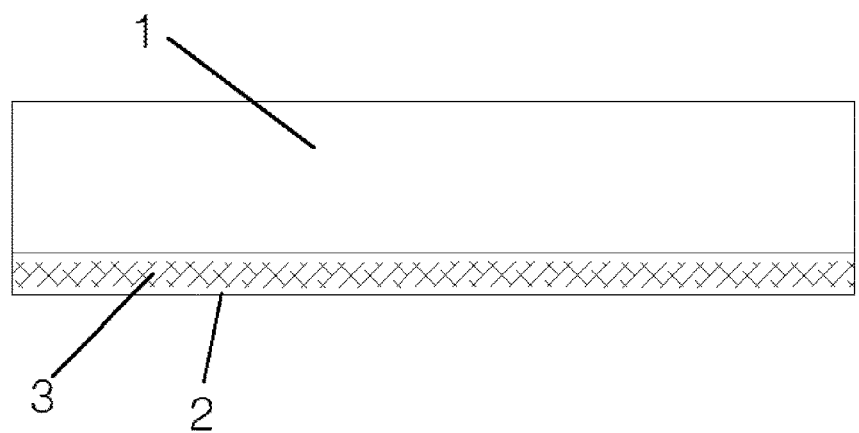
FIG. 4: Shows the cross-section of the completely finished part, showing how the mesh is embedded in the polymer matrix.

As observed in FIGS. 2, 3 and 4, in which the construction element of the present example is represented completely finished, the upper portion of the rigid part (1) is not affected by the polymer matrix (2) and the mesh (3) is completely embedded in the polymer matrix (2), 0.5 mm apart from the surface or outer layer of the polymer matrix (2).

The hardening or curing of the polymer matrix with the embedded mesh inside it is carried out at room temperature (unforced drying).

The invention claimed is:

1. A construction element for both indoor and outdoor raised floors, comprising a flat rigid panel having two opposing planar sides and reinforced on one of the planar sides by a polymer matrix made up of a resin combined with a catalyst that has a filament fiber mesh completely embedded inside the polymer mesh, and the weight of the embedded filament fiber mesh is less than 50% of the weight of the assembly formed by the polymer matrix plus the mesh.

2. The construction element according to claim 1, wherein the rigid part is made of ceramic, glass, metal, natural or artificial stone materials, or wood.

3. The construction element according to claim 1, wherein the polymer matrix is made up of a resin, in a percentage by weight between 80 and 95% of the total weight, combined with a catalyst, the percentage by weight of which is between 5 and 20% of the total weight, which upon reacting with the resin, produces the hardening of the polymer matrix.

4. The construction element according to claim 3, wherein the resins used in the polymer matrix is one of or a mixture of one or more of epoxy, polyurethane, silicones, elastomers, acrílycs, or polyester.

5. The construction element according to claim 3, wherein the catalyst used in the polymer matrix is formed by organic acids, anhydrides, amines, thiols with reactive hydrogens, such as dicarboxylic acid anhydride, urea and thiourea derivatives and/or polyamides or mixtures thereof.

6. The construction element according to claim 3, wherein the resin and catalyst mixture is applied on one of the sides of the rigid part with a grammage between 0.1 and 5 mm.

7. The construction element according to claim 3, wherein the viscosity of the polymer matrix before hardening is between 2,000 and 14,000 centipoises.

8. The construction element according to claim 1, wherein the sheet or mesh is made up of glass filament fibers, polyester, carbon fiber, plastic-based or metal, organic polymers and a binder mixture.

9. The construction element according to claim 1, wherein the grammage of the mesh is between 150 and 1,000 gr/m2.

10. The construction element according to claim 1, wherein the rigid part includes a PVC edging on the contour thereof.

11. The construction element according to claim 1, wherein the thickness of the assembly formed by the polymer matrix plus the mesh is between 0.5 and 5.5 mm.

12. The construction element according to claim 1, wherein the weight of the polymer matrix with the embedded mesh is between 0.75 and 4 kg/m2.

13. The construction element according to claim 1, manufactured according to the following method:
applying a mixture of the resin and the catalyst on one of substantially flat sides of the rigid part, with a viscosity of the mixture suitable for the product to self-level, such that 100% of the coated surface is completely covered, before hardening;

meshing the part by a mesher, which arranges the mesh over the resin and catalyst mixture, which is still in a liquid state and with a viscosity low enough so that when said mixture hardens thereby forming the polymer matrix, the mesh is completely embedded therein.

14. The construction element according to claim 13, wherein a mixture of cork with resins is applied on the polymer matrix.

15. The construction element according to claim 13, further comprising the step of grinding the end assembly, in order to remove the fiber or adhesive fragments from the sides of the element.

16. The construction element according to claim 13, wherein the application of the mixture of resin and catalyst is by a spray gun, a knife, or a curtain.

17. The construction element according to claim 1, wherein the rigid part is made of ceramic or glass.

18. The construction element according to claim 3, wherein the resins used in the polymer matrix is epoxy, polyurethane, silicones, elastomers, acrílycs, polyester or a mixture of the above with a molecular weight of less than 700 Umas.

19. The construction element according to claim 3, wherein the resin and catalyst mixture is applied on one of the sides of the rigid part with a grammage between 0.3 and 2.5 mm.

20. The construction element according to claim 3, wherein the viscosity of the polymer matrix before the hardening thereof is between 3,000 and 12,000 centipoises.

21. The construction element according to claim 1, wherein:

the polymer matrix is provided on only one of the planar sides of the rigid panel;

the mesh is 0.5 mm apart from an outer surface of the polymer matrix that contacts that rigid panel;

the catalyst, when mixed with the resin, hardens the resulting mixture to form the polymer matrix; and the rigid panel has a thickness within a range of 6 mm to 18 mm.

* * * * *